June 18, 1957 K. J. KOLLMANN ET AL 2,795,970
PLANETARY TRANSMISSION
Filed Feb. 24, 1953 2 Sheets-Sheet 1

INVENTORS
KARL J. KOLLMANN
CHARLES L. LOVERCHECK
BY Charles L. Lovercheck

June 18, 1957 K. J. KOLLMANN ET AL 2,795,970
PLANETARY TRANSMISSION
Filed Feb. 24, 1953 2 Sheets-Sheet 2

INVENTORS
KARL J. KOLLMANN
CHARLES L. LOVERCHECK
BY Charles L. Lovercheck
ATTORNEY

United States Patent Office 2,795,970
Patented June 18, 1957

2,795,970

PLANETARY TRANSMISSION

Karl J. Kollmann and Charles L. Lovercheck, Erie, Pa.; said Lovercheck assignor to said Kollmann Application February 24, 1953, Serial No. 338,496

3 Claims. (Cl. 74—750)

This invention relates to transmissions and more particularly to transmissions suitable for use in machines where a range of speeds is required and for use on bicycles.

In planetary transmissions made according to previous designs, the shifting was sometimes accomplished by moving the planetary gear assembly itself laterally to engage or disengage the shifting elements. This resulted in difficulty in shifting and also in a design of transmission which was space consuming and not compact.

In other planetary transmissions, a plurality of planetary units were used and bands were disposed around the outside thereof to hold various sections of the cascaded planetary gears against rotation to give the desired result in speed increase or reduction. In most of these previous transmissions, it was only possible to accomplish a selection of two speeds with the transmission.

It is, accordingly, an object of our invention to overcome the above and other defects in previous transmissions by providing a planetary type transmission which will give an output of three different speeds and which can be controlled by detents engaging the transmission elements from the outside edges thereof.

Another object of our invention is to provide a planetary transmission with an output of three different speed ratios which can be installed on the crank of a conventional bicycle.

Another object of our invention is to provide a novel shifting means for a planetary type transmission.

With the above and other objects in view, the present invention consists of the combination and arrangement of parts hereinafter more fully described, illustrated in the accompanying drawings, and more particularly pointed out in the appended claims, it being understood that changes may be made in the form, size, proportion, and minor details of construction without departing from the spirit or sacrificing any of the advantages of the invention.

Figure 1:
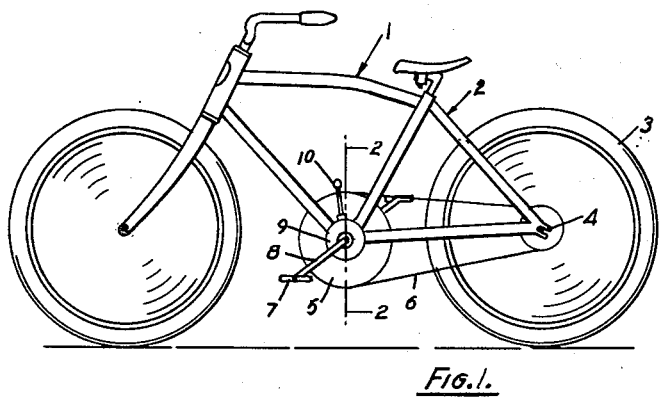
Fig. 1 is a side view of a bicycle having our novel transmission installed therein.

Now with more specific reference to the drawings, Fig. 1 shows a bicycle 1 having a frame 2 and a rear wheel 3. The rear wheel has a driven sprocket 4 attached thereto and connected to drive sprocket 5 by chain 6. A foot engaging pedal 7 is connected by crank 8 through transmission 9 which is controlled by gear shift lever 10. The sprocket 5 is attached to the drive housing 11 by means of pins 12 and is journalled on the sleeve 13 at 14 and journalled in the frame 2 having the fixed housing 15 which is provided with bearing ways 16 and balls 17 which engage ways 18 on the drive housing. Driven housing 20 is fixed to rotate with the transverse shaft 21 by means of a key 22 which engages a keyway 23 in the shaft 21 and engages a keyway 24 in the driven housing 20. One end of the shaft 21 is journalled in the housing 15 by balls 26 which engage ways 27 in housing 15 and engage ways 28 on the crank. The housing 15 has the side portions 29 threadably engaging the cylindrical housing 15 at 30 and the cylinder member 31 threadably engages the housing at 32.

The planetary assembly is made up of sun gear 40 which is fixed against rotation to sleeve 41 and sleeve 41 has arm 42 attached thereto at 43 by screw 44 which engages the sleeve 41 at 45. The arm 42 is fixed to the frame 2 by means of collar 46 which surrounds the frame member and screw 47 holds the arm 42 to the collar 46. The planetary gears 48 are supported on the plates 49 by means of the hubs 50 which are attached to the outsides of the plates by peened portions 51 and shoulders 52 which engage the insides of the plates. Ring gear 54 has teeth 59 which engage the teeth 60 on the planetary gears and the teeth 60 on the planetary gears in turn engage the teeth 61 on the sun gear.

From this description of the planetary assembly, it will be apparent that the hubs 50 rotate with the plates 49 which support the planetary gears and carry the planetary gears around with them and that the sun gear 40 is fixed on the sleeve 13.

A shifting ring 60a is keyed to housing 20 to rotate therewith and is laterally slidable therewith and the shifting ring 61a is fixed to rotate with the housing 11. The shifting rings 60a and 61a are moved laterally by the clutch ring 66 which is slidable on the shaft 21 at 67 and has a circumferential groove 68 which engages the bifurcated end 69 of the shifting lever 10. The shifting lever 10 is swingably mounted in the housing 15 at 70 by ball 71a which is held in the groove by the collar 70.

It will be apparent from the description that when the lever 10 is moved to the left in the figure, the bifurcated end 69 will move the shifting rings to the right and when it is moved to the right, it will move the shifting rings to the left. The shifting ring 60a has the camming portions 71 and 72 attached thereto and the shifting ring 61a has the camming portion 73 attached thereto. When the shifting lever 10 is moved to the left, the camming portion 71 will force the ball 74 into engagement with the notch 75 on the ring gear, thereby holding the ring gear against rotation with regard to the housing 20 and causing the housing 20 to rotate with the ring gear. At the same time, the ball 77 will move out of engagement with the notches 78 on the outside of the plates 49 and allow the plates 49 to rotate independent of the shifting housing. It will be noted that the camming portion 73 will be still in engagement with the ball 80 and the ball 80 will continue to be held in the notch 81 in the ring gear. The ball 82 will remain out of engagement with the notch 83 in the plate. In this position, both the drive housing and the driven housing will be held against rotation with respect to each other.

Figure 2:
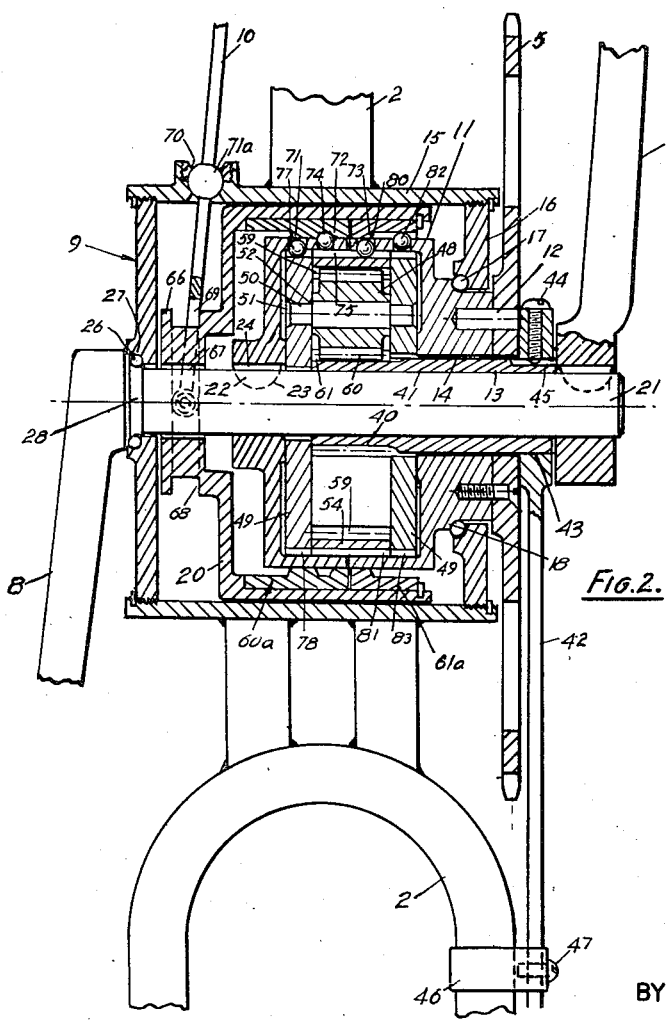
Fig. 2 is a cross sectional view taken on line 2—2 of Fig. 1.

In the position of the shifting ring shown in Fig. 2, the drive housing is held against rotation with regard to the plates which support the planetary gears by the balls 77 and the ring gears are in rotative engagement with the drive housing. If it is desired to obtain a still further gear reduction, the shifting lever is moved to a still further position toward the left. In that position of the gear shift lever 10, the shifting ring will be in the extreme right position and the camming portion 73 will force the ball 82 into engagement with the notch 83 and the camming portion 71 will force the ball 74 into engagement with the notch 75 in the ring gear. In this position, the drive housing 11 will be fixed to rotate with the plates 49 and the driven housing 20 will be held against rotation with regard to the ring gear to rotate therewith.

From the above, it will be seen that a transmission has been provided wherein three speeds have been accomplished by the simple expedient of engaging different sets of detents selectively with a plate that carries the planetary gears in a planetary transmission or with the ring gear and that direct drive is obtained by fixing both the drive and driven gears to the ring gear and this accomplished by a simple shifting mechanism employing detents.

Figure 3:
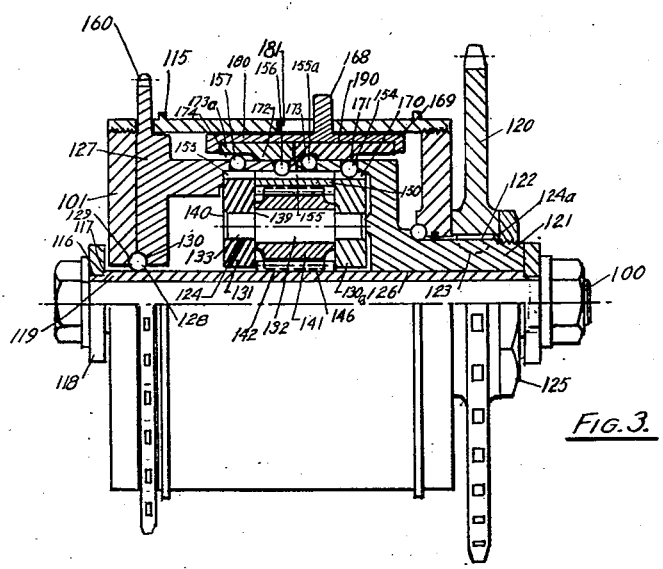
Fig. 3 is a side view partly in cross section of another embodiment of our novel transmission.

In the embodiment of our invention shown in Fig. 3, we disclose a transmission which has similar utility and can be used for a variety of purposes wherein a speed reduction is desired. In Fig. 3, we show a transmission which has general utility for use in any machine wherein a speed reduction is required. A shaft 100 is fixed against rotation to the side member 101 of the housing 115. The shaft has a reduced diameter end 116 having a shoulder 117 whereon the washer 118 rests. The side member 101 threadably engages the enlarged portion of the shaft at 119. A sprocket 120 is keyed against rotation to the drive housing 121 by means of key 122 which engages keyway 123 in the housing and keyway 124a in the sprocket. The lock nut 125 prevents the sprocket from coming off of the drive housing. The drive housing rotates on the shaft 100 at 126. The driven housing 127 is rotatively mounted on the fixed housing side member 101 by means of ball 128 which engages bearing race 129 in the side plate 101 and the bearing race 130 in the driven housing.

Figure 4:
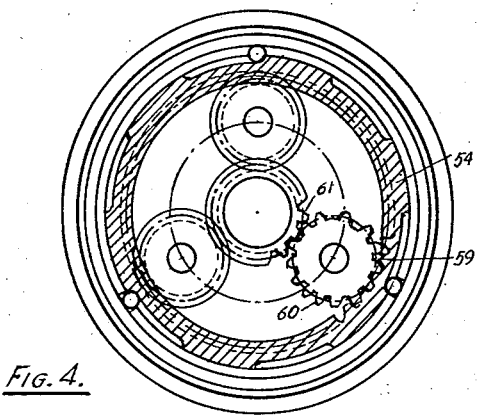
Fig. 4 is a detailed side view having certain parts broken away of our novel transmission.

This embodiment of the invention is identical to the planetary assembly in the embodiment shown in Fig. 2; that is, the side plates 130a and 131 are held against relative movement by the hubs 132 which have reduced side portions 133 which engage holes 124 in the side plates and the plates are held against movement away from the hubs against the shoulders 139 and the peened portions 140. The planetary gears 141 are freely rotatable on these hubs. The sun gear 142 is fixed against rotation to the shaft 100 by the key 146 and the ring gear 150 rotatively floats on the planetary gears as shown in Fig. 4. Corresponding notches 155 are provided on the periphery of the ring gear and on the periphery of the plates which carry the planetary gears. These notches are engaged by the detent balls 156 and 157, respectively. A driven sprocket 160 is attached to the driven housing 127.

In the position of the shifting lever 168 shown in Fig. 3, the transmission will be in the low speed position; that is, the shifting ring 169 will be locked against rotation to the plate 130a by means of the ball 154 being held in the groove 170 by the camming portion 171 on the shifting ring and the ball 155a will be moved into the relieved portion 173 on the shifting ring 169. The ball 156 will be held in engagement with the notch 155 in the ring gear by means of the camming portion 172 on the shifting ring 173a and the ball 157 will be moved into relieved portion 174 on the shifting ring. The shifting rings are moved together by the shifting collar 180 which is held against rotation by the shifting lever 168 and the shifting lever 168 is slidable in slot 181 in the housing 115. The shifting rings 173a and 169 are held against rotation with regard to the drive housing 121 and the driven housing 127, respectively, by lateral keyways similar to those shown in the embodiment of the invention shown in Fig. 2. The shifting rings 169 and 173a slide on the surface 190 between the shifting rings and the shifting collar.

In the foregoing specification, we have set forth the invention in its preferred practical forms but we are aware that the structure shown is capable of modification within a range of equivalents without departing from the invention which is to be understood is broadly novel as is commensurate with the appended claims.

What we claim is:

1. A transmission comprising two spaced plates, means to support a planetary gear between said plates, a ring gear disposed between said plates and in operative engagement with said planetary gear, a sun gear disposed between said plates and in operative engagement with said planetary gear, and means connecting a driven member to said plates and connecting a driving member to said ring gear, said means being movable to a position to connect said driving member to said plates and said driven member to said ring gear and movable further to connect said drive member and said driven member together, said movable means comprising balls carried by said drive member and said driven member and cam means to force said balls into engagement with said ring gear and said plates.

2. The transmission recited in claim 1 wherein said balls are carried in circumferentially spaced openings in said drive member and said cam means comprises ridges on said drive member.

3. The transmission recited in claim 1 wherein said drive member comprises a cup-shaped member having a driving shaft attached to the bottom of said cup-shaped member, the sides of said cup-shaped member overlying said driven member, cam surface being disposed around the inner periphery of the side edges of said cup-shaped member.

References Cited in the file of this patent

UNITED STATES PATENTS

| 587,787   | Buckler      | Aug. 10, 1897 |
| 823,658   | Wilson et al.| June 19, 1906 |
| 2,062,195 | Smith        | Nov. 24, 1936 |
| 2,464,890 | Premo        | Mar. 22, 1949 |

FOREIGN PATENTS

| 168,446 | Austria | Nov. 15, 1950 |
| 319,475 | France  | Mar. 11, 1902 |
| 415,402 | Italy   | Oct. 8, 1946  |